(12) United States Patent
Dugas et al.

(10) Patent No.: US 6,787,729 B2
(45) Date of Patent: Sep. 7, 2004

(54) MULTI-AXIS ARTICULATABLE ROBOT HAVING A WELD GUN WITH INVERTED ROLLER SCREW ACTUATOR

(75) Inventors: Michael R. Dugas, Brighton, MI (US); Velibor Kilibarda, Birmingham, MI (US); Jeffrey R. Angel, Lake Orion, MI (US)

(73) Assignee: Progressive Tool & Industries Co., Southfield, MI (US)

( * ) Notice: Subject to any disclaimer, the term of this patent is extended or adjusted under 35 U.S.C. 154(b) by 126 days.

(21) Appl. No.: 10/274,607

(22) Filed: Oct. 21, 2002

(65) Prior Publication Data

US 2003/0094441 A1 May 22, 2003

Related U.S. Application Data

(63) Continuation-in-part of application No. 09/767,510, filed on Jan. 23, 2001, now Pat. No. 6,469,272.

(51) Int. Cl.$^7$ .............................................. B23K 11/10
(52) U.S. Cl. ..................................... 219/86.32; 901/42
(58) Field of Search .......................... 219/86.32, 86.1, 219/86.25, 86.33, 86.41, 86.51, 86.61; 228/44.3; 901/42

(56) References Cited

U.S. PATENT DOCUMENTS

| | | |
|---|---|---|
| 5,099,161 A | 3/1992 | Wolfbauer, III |
| 5,141,093 A | 8/1992 | Alexander |
| 5,321,225 A | 6/1994 | Boyer |
| 5,340,960 A | 8/1994 | Takasaki et al. |
| 5,484,975 A | 1/1996 | Itatsu |
| 5,491,372 A | 2/1996 | Erhart |
| 5,528,011 A | 6/1996 | Kono et al. |
| 5,557,154 A | 9/1996 | Erhart |
| 5,974,948 A | 11/1999 | Thompson et al. |
| 5,988,486 A | 11/1999 | Kobayashi et al. |
| 6,204,468 B1 | 3/2001 | Habert |

Primary Examiner—Clifford C. Shaw
(74) Attorney, Agent, or Firm—Young & Basile, P.C.

(57) ABSTRACT

A multi-axis articulatable robot with a weld gun having a pair of opposing arms, where at least one arm is movable relative to the other arm to apply pressure to a workpiece during a welding operation. At least one of the opposing arms of the weld gun can be rotatable or translatable relative to the other arm. At least one arm is moved relative to the other arm by an inverted roller screw linear actuator. The robot can include an electric controller for controlling the operation of the actuator of the weld gun as an additional axis of the robot movement. The actuator can be mounted on either of the opposing arms.

20 Claims, 3 Drawing Sheets

MULTI-AXIS ARTICULATABLE ROBOT HAVING A WELD GUN WITH INVERTED ROLLER SCREW ACTUATOR

CROSS REFERENCE TO RELATED APPLICATION

This application is a Continuation-in-Part application of application Ser. No. 09/767,510 filed on Jan. 23, 2001 now U.S. Pat. No. 6,469,272.

FIELD OF THE INVENTION

The invention relates to a multi-axis articulatable robot with a weld gun having a pair of opposing arms, movable relative to each other, and an inverted roller screw actuator for moving the arms as an additional axis controlled by the robotic controller.

BACKGROUND OF THE INVENTION

A spot welding apparatus is used to produce a spot weld on a work piece, such as an automotive body panel. The spot welding apparatus traditionally includes C-shaped or X-shaped gun arms having a pair of welding tips on opposing arms spaced apart from each other. The welding tips define welding electrodes. The welding arms are movable toward each other and can be positioned on opposing sides of a workpiece during the spot welding operation. A welding apparatus can include one welding arm that is maintained in a fixed position while the second welding arm is movable. The welding apparatus can include welding arms movable with respect to one another either reciprocally, linearly or rotatably. Air cylinders and hydraulic cylinders have been used to produce movement in one or both of the welding arms.

In a spot welding operation, the pressure applied to the workpiece by the welding electrodes can be a factor in the success of the welding operation. The pressure acting on the workpiece is determined by the magnitude of thrust used to move the welding arms, specifically, the force applied by the air cylinder or hydraulic cylinder. Achieving an optimum welding operation can be difficult when a single workpiece requires multiple spot welding operations and each spot welding operation should be performed at a different pressure. It can be difficult to vary the pressure applied between various spot welds on a single workpiece by way of an air cylinder or an hydraulic cylinder. Generally, air cylinders and hydraulic cylinders are incapable of varying the pressure between welding electrodes quickly and precisely.

A robot system typically includes a controller to control the position, speed, acceleration, and force at any point along a path of travel of the robot and to control a servo motor corresponding to each axis of articulation of the robot. Typically, robots are provided with the capability of six axis articulation. However, the number of articulatable axes can be more or less depending on the particular application. In most configurations, the work tool supported by the robot for movement through the predetermined path includes a separate controller to control the particular tool. In the case of spot welding, the work tool controller can include an electrode pressing force controller and a welding electrical current controller. The separate controllers for control of the articulatable axes of the robot and movement of the welding tool requires additional time for opening and closing the tool while moving from one spot to another. It would be desirable to decrease the amount of time required for opening and closing the tool while moving from one weld spot to another in order to obtain productivity gains.

SUMMARY OF THE INVENTION

The present invention provides a robot having a plurality of axes for articulation to move the robot along a predetermined path. A single controller is provided for controlling the articulation of the robot about the plurality of axes. The same robot controller can control the movement of a weld gun as an additional axis of movement relative to the other articulatable axes of the robot to improve productivity.

The present invention provides a weld gun for performing a welding operation on a workpiece. The weld gun includes a pair of opposing arms movable relative to each other. The opposing arms apply pressure to a workpiece during a welding operation. The weld gun of the present invention also includes an inverted roller screw linear actuator. The inverted screw linear actuator can move the opposing arms relative to each other. The arms can be translatable or linearly reciprocal relative to each other, such as in a straight action C-shaped weld gun. Alternatively, the opposing arms can be rotatable relative to each other, such as in a pinch type x-shaped weld gun. The weld gun of the present invention can also include means for controlling the inverted screw linear actuator. The controlling means can include an electric control system engagable with a motor of the inverted screw linear actuator. The inverted screw linear actuator can include an elongate shaft having a first end for connecting to one of the opposing arms. The actuator can also include a rotatable threaded race for engaging the elongate shaft and a rotary motor for rotating the threaded race. The actuator can be mountable to one of the opposing arms. The weld gun of the present invention can also include an interchangeable electrode cap connectible to the end of each opposing arm and means for selectively retaining the electrode cap on each arm.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
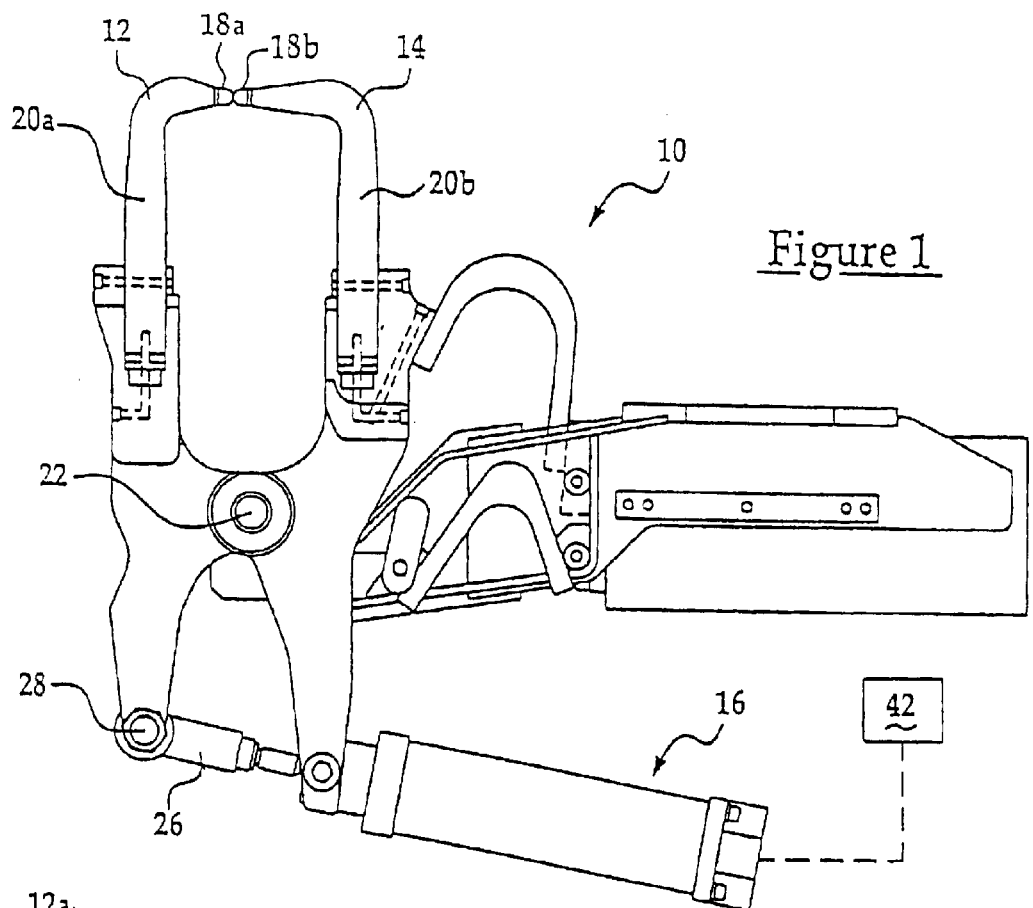
FIG. 1 is a drawing of a pinch type or X-shaped rotary weld gun according to the present invention with the inverted screw linear actuator mounted on one of the opposing arms.

The present invention provides a weld gun 10 having a first arm 12, a second arm 14 and an inverted roller screw linear actuator 16. The first arm 12 can include an electrode cap 18a and a cap adaptor 20a. The second arm 14 can include an electrode cap 18b and a cap adaptor 20b. The cap adaptors 20a and 20b can each selectively retain an individual electrode cap 18a and 18b. Different configurations of electrode caps 18a and 18b can be used with the weld gun 10. Different configurations of electrode caps 18a and 18b can be desirable to perform welding operations on a variety of different workpiece configurations by the weld gun 10.

The first arm 12 and the second arm 14 are movable relative to each other. During a welding operation by the weld gun 10, the first arm 12 and the second arm 14 move relative to each other to position the electrode caps 18a and 18b to a position where a welding operation can be performed on a workpiece. The workpiece is positioned in between the electrode caps 18a and 18b. The first arm 12 and the second arm 14 are moveable relative to one another, either rotatably linearly reciprocable or translatable relative to each other.

Figure 2:
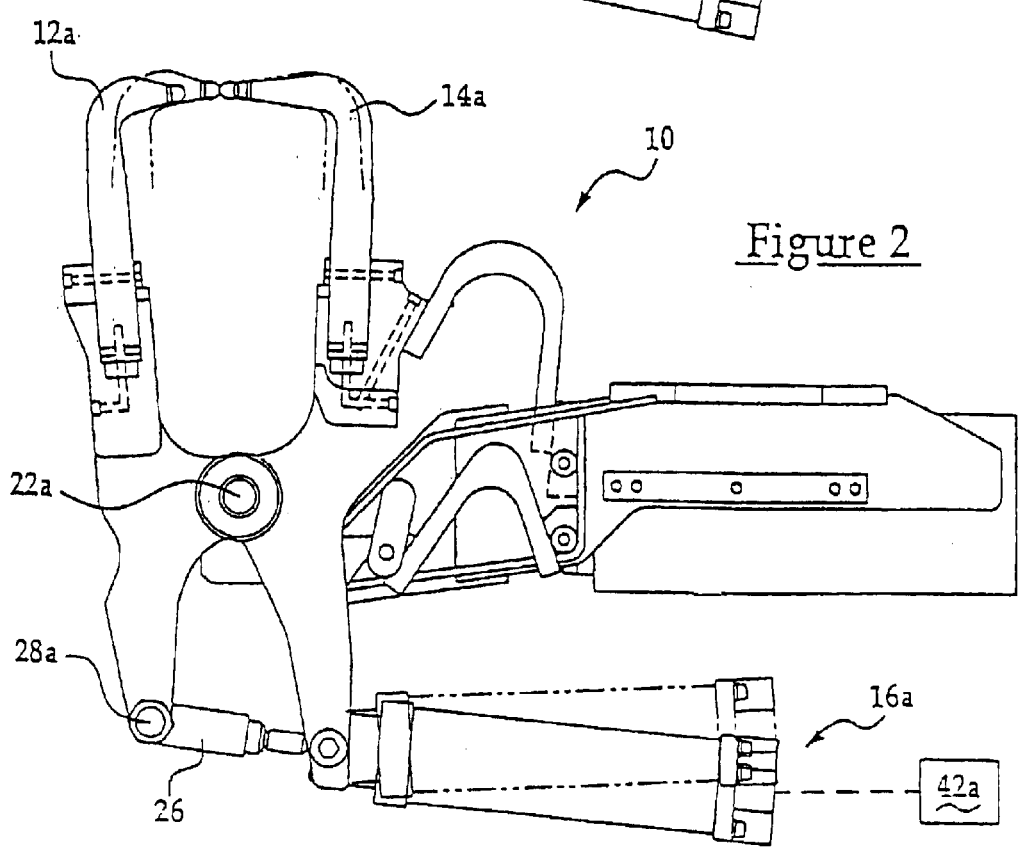
FIG. 2 is a drawing of a pinch type or X-shaped rotary weld gun according to the present invention with the inverted screw linear actuator mounted to one of the opposing arms.

In one embodiment of the present invention where the first arm 12 and second arm 14 are rotatable relative to each other, the weld gun 10 is commonly referred to as a pinch type weld gun. FIGS. 1 and 2 show two embodiments of a pinch type weld gun according to the present invention. The first arm 12 and the second arm 14 each rotate about the pivot point 22. However, the present invention can be practiced where one of the first arm 12 and the second arm 14 are rigidly connected to the weld gun 10 and the other of the first arm 12 and the second arm 14 are rotatable about the pivot point 22.

Figure 3:
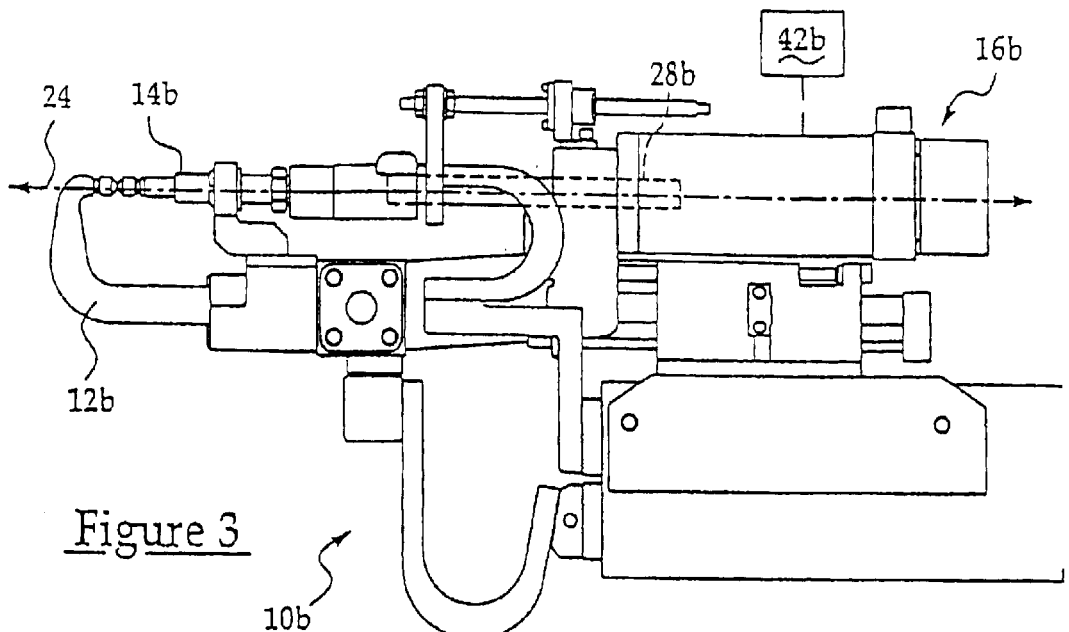
FIG. 3 is a drawing of a straight action or C-shaped linearly reciprocal weld gun according to the present invention.
Figure 4:
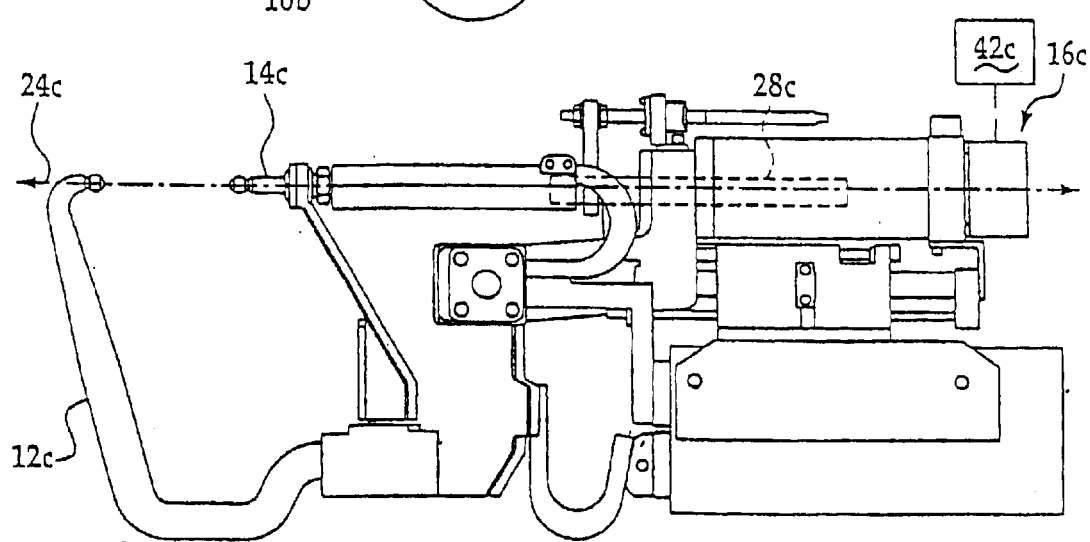
FIG. 4 is a drawing of a straight action or C-shaped linearly reciprocal weld gun according to the present invention.

In another embodiment of the present invention, the first arm 12 and second arm 14 are translatable with respect to each other. The weld gun 10 of this configuration is commonly referred to as a straight action weld gun. FIGS. 3 and 4 show two embodiments of a straight action weld gun according to the present invention. The first arm 12b can be rigidly connected to the weld gun 10b and the second arm 14b can be translated along the axis 24. The weld gun 10, according to the present invention, can include a straight action weld gun where the first arm 12b and second arm 14b are both translatable along the axis 24. Alternatively, the weld gun 10, in the form of a straight action weld gun, can include a first arm 12b translatable along the axis 24 and a second arm 14b rigidly connected to the weld gun 10.

The present invention includes an inverted roller screw linear actuator 16. A screw drive or actuator can convert rotary motion into linear motion, or vice versa. In a screw drive, two threaded parts are operably associated. For example, a rotating shaft can communicate linear motion to a nut follower through the interaction of threaded portions of each part. Roller screw drives differ from screw drives in that each of the mating parts can include corresponding helical grooves instead of screw threads. Roller screws are positioned in the helical grooves and facilitate the communication of motion between the two parts. Roller screw drives are desirable in applications that require heavy loads at low friction and high efficiency. The helical grooves are formed to create continuous circuits. The nut follower in a screw drive is the equivalent of a ball nut in a roller screw drive. An inverted screw drive differs from a screw drive in that the nut is rotated to produce linear motion in the shaft. Therefore, an inverted roller screw actuator, according to the weld gun of the present invention, includes helical grooves in the mating parts, roller screws positioned to engage with the helical grooves, and through rotary motion of the ball nut, produces linear motion in a shaft to move the weld gun arms relative to one another.

Figure 5:
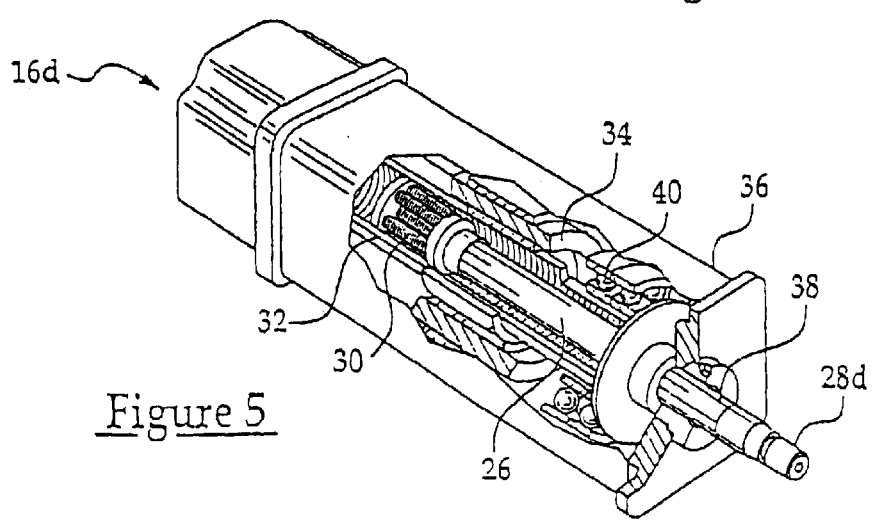
FIG. 5 is a cutaway view of an inverted roller screw linear actuator according to the present invention.

The first arm 12 and second arm 14 can be moved relative to each other with the inverted roller screw linear actuator 16. FIG. 5 shows an inverted screw linear actuator 16 according to the present invention. The inverted screw linear actuator 16 includes an elongate shaft 26. The shaft 26 includes a connecting end 28 and a screw section 30. In FIG. 5, the connecting end 28 is shown as a threaded end. The shaft 26 according to the present invention, can include any suitable connection for attaching the actuator to the arm. The screw section 30 can be positioned along the shaft 26 opposite from the connecting end 28. The inverted screw linear actuator 16 can also include a threaded race 32. The screw section 30 and threaded race 32 are formed with corresponding helical grooves for roller screws to engage while operable contacting opposing surfaces of the screw section 30 and threaded race 32. The threaded race 32 is rotatable with respect to the shaft 26. As the threaded race 32 rotates, the roller screw engages the helical grooves of the threaded race 32 with the helical grooves of the screw section 30 of the shaft 26 to cause translational movement of the shaft 26. Rotation of the threaded race 32 in one direction can cause the shaft 26 to extend from the inverted screw linear actuator 16, while rotation of the threaded race 32 in the opposite direction can cause the shaft 26 to retract into the inverted screw linear actuator 16. The inverted screw linear actuator 16 also includes a rotary motor 34. The motor 34 engages the threaded race 32 and causes the threaded race 32 to rotate. The motor 34 preferably is an integral three-phase brushless servo-motor. The inverted screw linear actuator 16 can include a housing 36 to enclose the motor 34, the threaded race 32, and the screw section 30 of the shaft 26. The housing 36 can include a rod seal 38 to prevent lubricants of the inverted screw linear actuator 16 from escaping the housing 36. The inverted screw linear actuator 16 can also include one or more bearings 40 to support the rotational movement of the threaded race 32.

The inverted screw linear actuator can be mounted on one of the first arm 12 and second arm 14. In FIG. 2, the actuator 16a is mounted on the second arm 14a. The actuator 16a follows the movement of the second arm 14a. The connecting end 28 of the actuator 16 is connectible to one of the first arm 12 and the second arm 14. In FIGS. 1 and 2, the connecting ends 28 and 28a respectively, are connected to the first arms 12 and 12a, respectively. As the shaft 26 extends from the actuator 16, the first arm 12 rotates to move the electrode cap 18a to a position adjacent to the electrode cap 18b. The connecting ends 28 and 28a are connected to the second arms 14 and 14a in a pinch type weld gun. FIGS. 3 and 4 show a straight action weld gun wherein the connecting ends 28b and 28c, respectively, are connected to the second arms 14b and 14c. The connecting end 28b can be connected to the first arm 12b in a straight action weld gun.

Electric control means 42 is provided for controlling the operation of the motor 34. The electric control means 42 can be a hard wired circuit or a software based microprocessor control. An embodiment of the weld gun 10, including the electric control means 42, automates repetitive welding operations for workpieces requiring multiple spot welds. For example, a single workpiece can require several spot welds, each spot weld requiring the application of a different amount of force between the electrode caps 18a and 18b. The electric control means 42 can open and close the first arm 12 and second arm 14 as well as adjust the degree of pressure between the electrode caps 18a and 18b rapidly and precisely.

Figure 6:
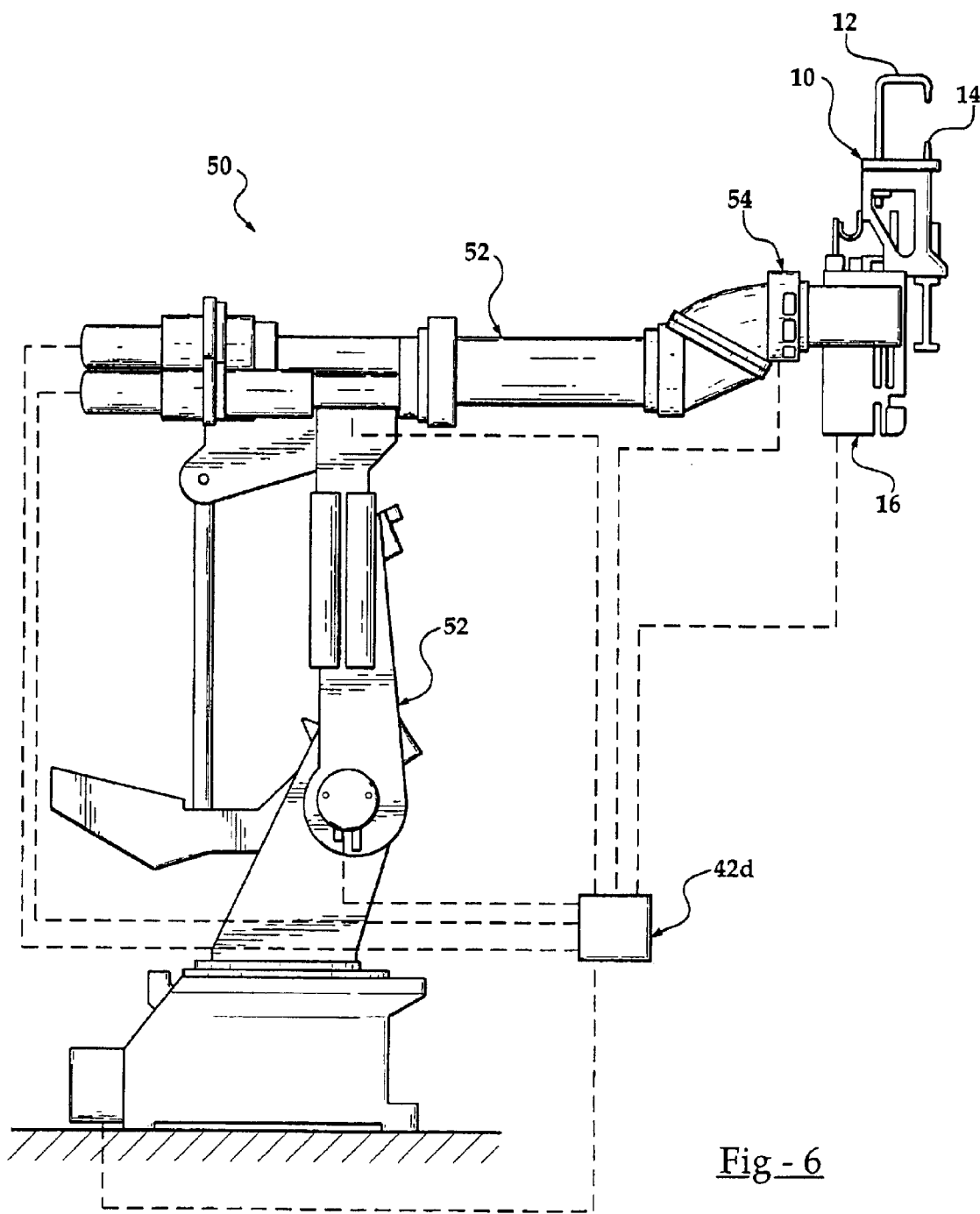
FIG. 6 is a simplified schematic view of a robot having a single controller for performing movement along a predetermined path using a plurality of articulatable axes and capable of controlling at least one more axis than used in the movement of the robot along the path of travel.

Referring now to FIG. 6, a robot 50 can include an electric control means 42d for controlling movement of the robot along a predetermined path of travel. The predetermined path of travel is programmable with the electric control means 42d to control a plurality of axes of movement. By way of example and not limitation, a typical robot 50 can include six axes of movement or articulation. Typically the six axes of movement include rotation about at least one vertical axis, and a rotation about one or more horizontal axes allowing movement through 3-dimensional space. The robot 50 can include one or more arm members 52 which terminate in an outer end at a wrist 54. The welding gun 10, 10a, 10b, or 10c according to the present invention can be mounted on the outer end or wrist 54 of the arm members 52 of the robot 50 for controlled movement by the electric control means 42d as an additional axis of articulation or movement. The integration of the control function into a single electric controller 42d for moving the robot 50 and weld gun 10 through the desired motion increases productivity by reducing cycle time between welding operations. By way of example and limitation, a robot 50 having six axes of movement or articulation according to the present invention would include the weld gun 10, 10a, 10b, or 10c according to the present invention controlled as a seventh axis of articulation or motion.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An apparatus for performing a welding operation on a workpiece comprising:
    a robot having an arm with a plurality of axes of movement;
    a robot controller for moving the arm along a predetermined path;
    a pair of opposing arms, at least one arm movable relative to the opposing arm to apply pressure to the workpiece during a welding operation; and
    an inverted roller screw linear actuator for moving the at least one arm relative to the opposing arm in response to the robot controller as an additional axis of movement.

2. The apparatus of claim 1 wherein the inverted roller screw linear actuator further comprises:
    an elongate shaft having a first end for connection to one of the opposing arms and a threaded portion opposite from the first end;
    a rotatable body having threaded race formed thereon for engaging a plurality of roller bearings interposed between the race and the threaded portion of the elongate shaft to translate the elongate shaft in either linear direction in response to rotation of the body in either rotational direction; and
    a rotary motor for rotating the body in either rotational direction.

3. The apparatus of claim 1 wherein the inverted screw linear actuator is mountable to one of the opposing arms.

4. The apparatus of claim 1, wherein the robot controller further comprises:
    means for controlling the inverted screw linear actuator.

5. The apparatus of claim 4 wherein the controlling means further comprises:

an electric control system operably engagable with a motor of the inverted roller screw linear actuator to control the motion of an elongate shaft of the inverted roller screw linear actuator.

6. The apparatus of claim 1 wherein the opposing arms are translatable relative to each other.

7. The apparatus of claim 6 wherein the opposing arms form a straight action weld gun.

8. The apparatus of claim 1 wherein the opposing arms are rotatable relative to the other.

9. The apparatus of claim 8 wherein the opposing arms form a pinch type weld gun.

10. The apparatus of claim 1 further comprising:
    an interchangeable electrode cap connected to an end of each arm in opposition to one another for movement between an open position spaced from one another to a closed position capturing a workpiece therebetween for welding; and
    means for selectively retaining the electrode cap on each arm.

11. An apparatus for performing a welding operation on a workpiece comprising:
    a robot having an arm with multiple axes of articulation;
    a robot controller for moving the arm along a predetermined path;
    a pair of opposing arms, at least one arm movable relative to the opposing arm to apply pressure to the workpiece during a welding operation; and
    an inverted roller screw linear actuator for moving the at least one arm relative to the opposing arm and having an elongate shaft with a first end for connection to one of the opposing arms and a threaded portion opposite from the first end, a rotatable body having threaded race formed thereon for engaging a plurality of roller bearings interposed between the race and the threaded portion of the elongate shaft to translate the elongate shaft in either linear direction in response to rotation of the body in either rotational direction, and a rotary motor for rotating the body in either rotational direction in response to the robot controller as an additional axis of articulation.

12. The apparatus of claim 11 wherein the opposing arms are translatable relative to each other.

13. The apparatus of claim 12 wherein the opposing arms form a straight action weld gun.

14. The apparatus of claim 11 wherein the opposing arms are rotatable relative to the other.

15. The apparatus of claim 14 wherein the opposing arms form a pinch type weld gun.

16. The apparatus of claim 11 further comprising:
    means for controlling the inverted roller screw linear actuator.

17. The apparatus of claim 16 wherein the controlling means further comprises:
    an electric control system operably engagable with a motor of the inverted screw linear actuator to control the motion of an elongate shaft of the inverted screw linear actuator.

18. The apparatus of claim 11 wherein the inverted roller screw linear actuator is mountable to one of the opposing arms.

19. The apparatus of claim 11 further comprising:
    an interchangeable electrode cap connected to an end of each arm in opposition to one another for movement between an open position spaced from one another to a closed position capturing a workpiece therebetween for welding; and means for selectively retaining the electrode cap on each arm.

20. An apparatus for performing a welding operation on a workpiece comprising:

a robot having an arm with multiple axes of movement;

a robot controller for moving the arm along a predetermined path;

a pair of opposing arms, at least one arm movable relative to the opposing arm to apply pressure to the workpiece during a welding operation;

an inverted roller screw linear actuator for moving the at least one arm relative to the opposing arm and having an elongate shaft with a first end for connecting to one of the opposing arms and a threaded portion opposite from the first end, a body having a rotatable threaded race formed thereon for engaging the threaded portion of the elongate shaft to translate the elongate shaft in either linear direction in response to rotation of the body in either rotary direction, and a rotatory motor for rotating the body in either rotary direction; and an electric control system operably engagable with the rotary motor of the inverted roller screw linear actuator to control the motion of the elongate shaft of the inverted roller screw linear actuator in response to the robot controller as an additional axis of movement.

* * * * *